Dec. 2, 1930.  D. J. STEWART  1,783,633
LIGHT CONTROL SYSTEM
Filed March 23, 1927   5 Sheets-Sheet 1
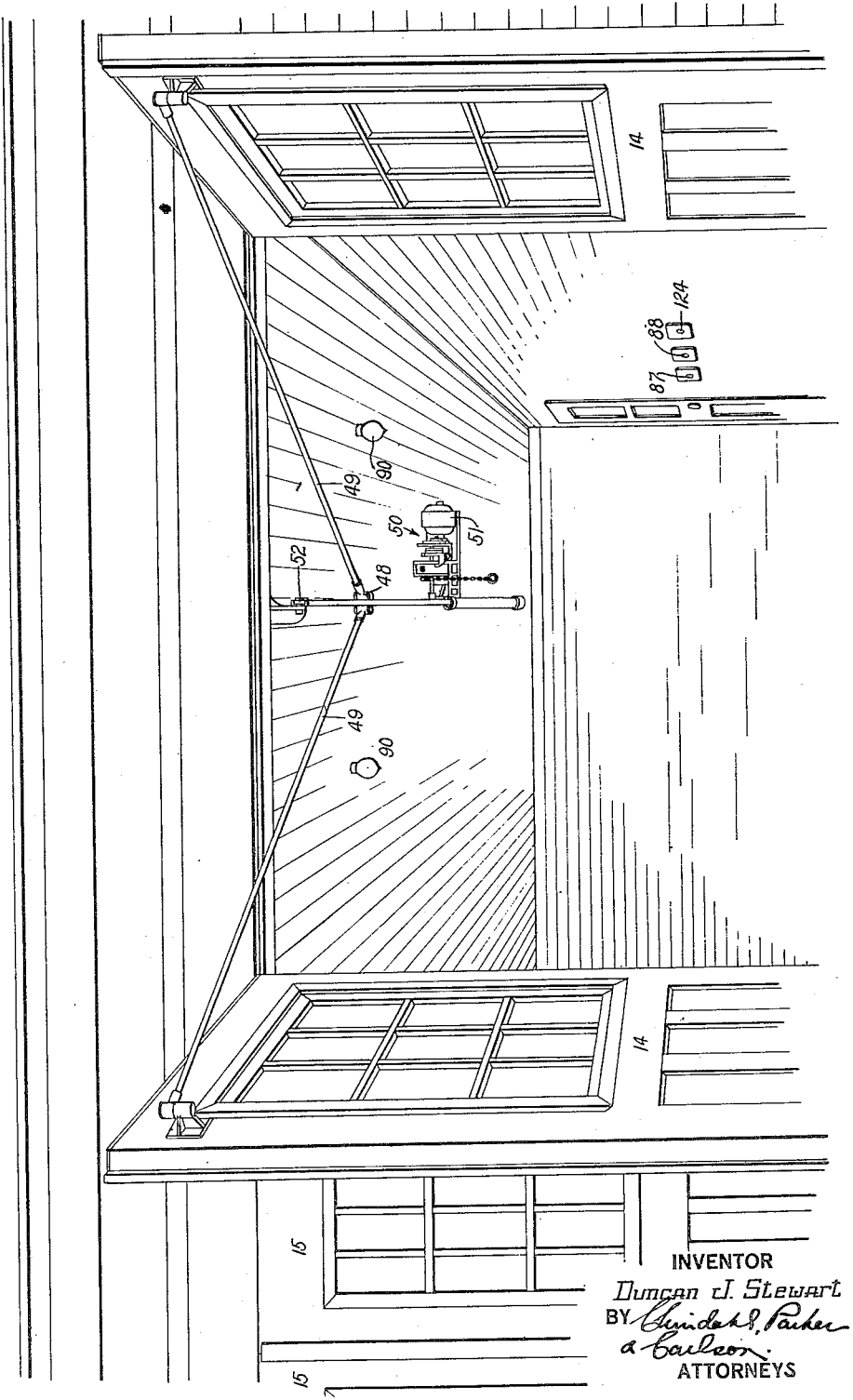
INVENTOR
Duncan J. Stewart
BY
ATTORNEYS Dec. 2, 1930.   D. J. STEWART   1,783,633
LIGHT CONTROL SYSTEM
Filed March 23, 1927   5 Sheets-Sheet 2
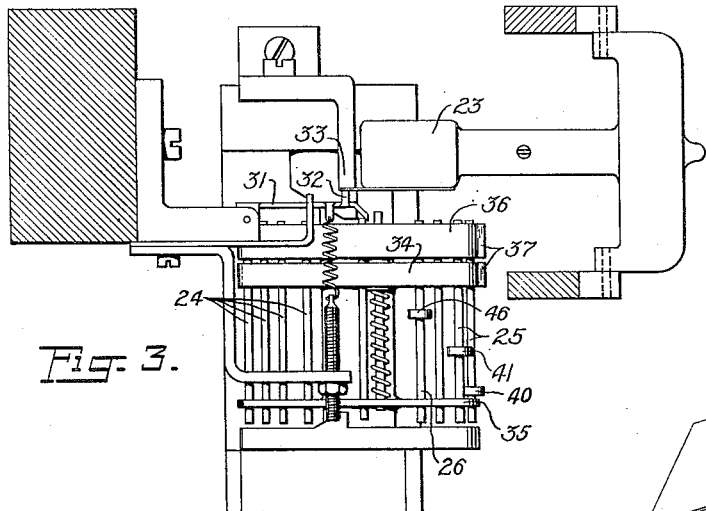
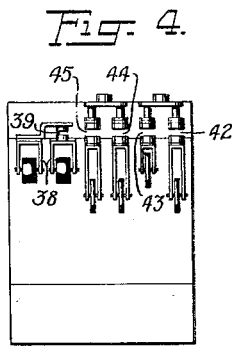
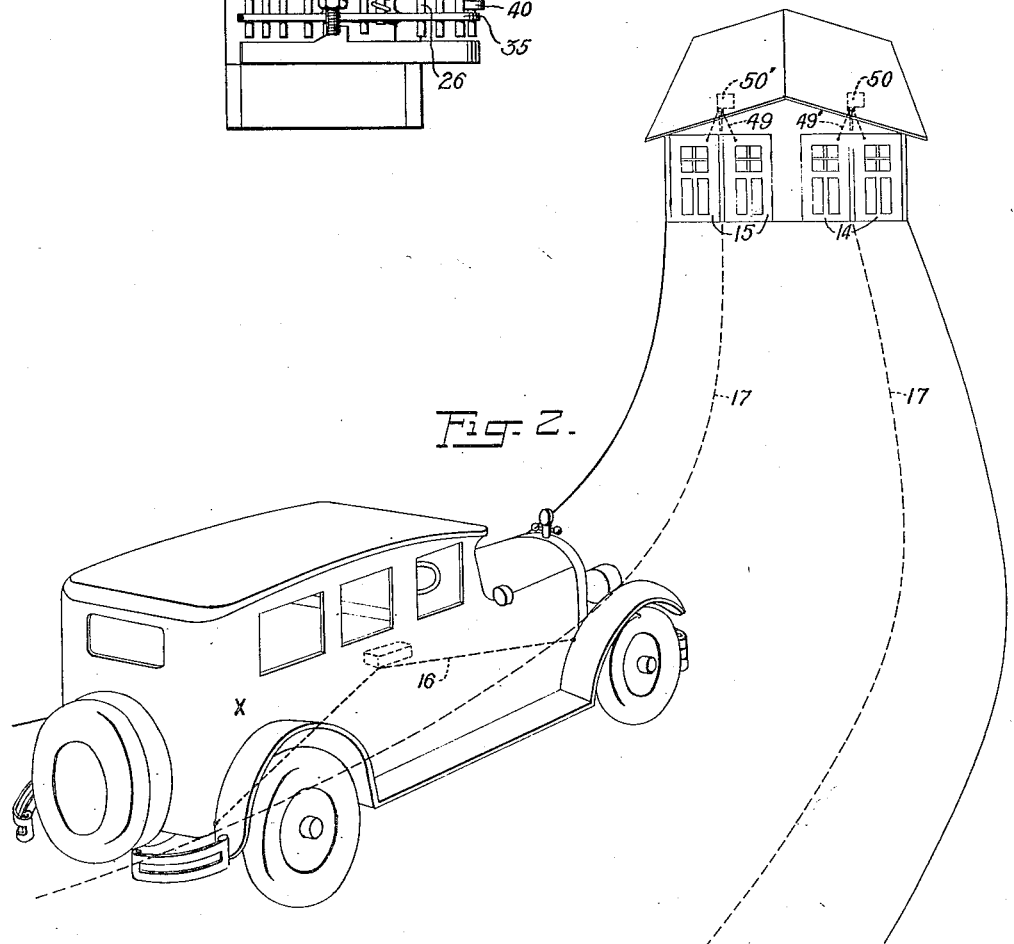
INVENTOR
Duncan J. Stewart
BY
*Chindahl, Parker & Carlson*
ATTORNEYS Dec. 2, 1930.　　　D. J. STEWART　　　1,783,633
LIGHT CONTROL SYSTEM
Filed March 23, 1927　　　5 Sheets-Sheet 3

INVENTOR
Duncan J. Stewart
BY
Clindahl, Parker a Carlson
ATTORNEYS

Dec. 2, 1930.          D. J. STEWART          1,783,633
                      LIGHT CONTROL SYSTEM
               Filed March 23, 1927     5 Sheets-Sheet 4
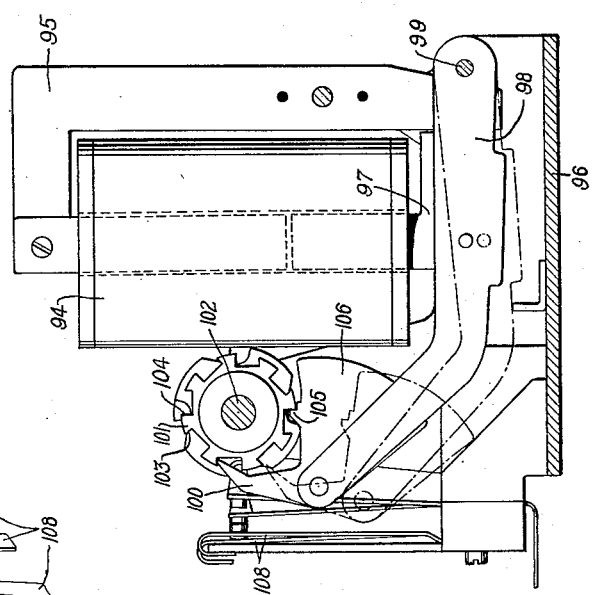
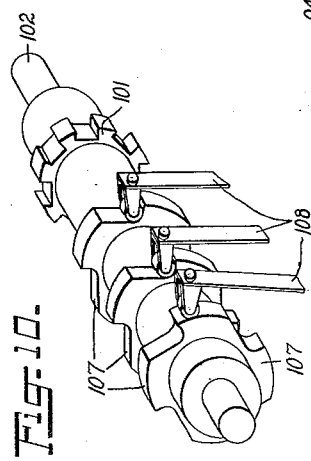
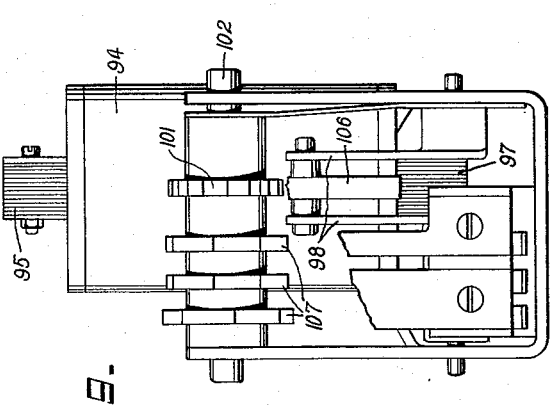
INVENTOR
Duncan J. Stewart
BY
ATTORNEYS

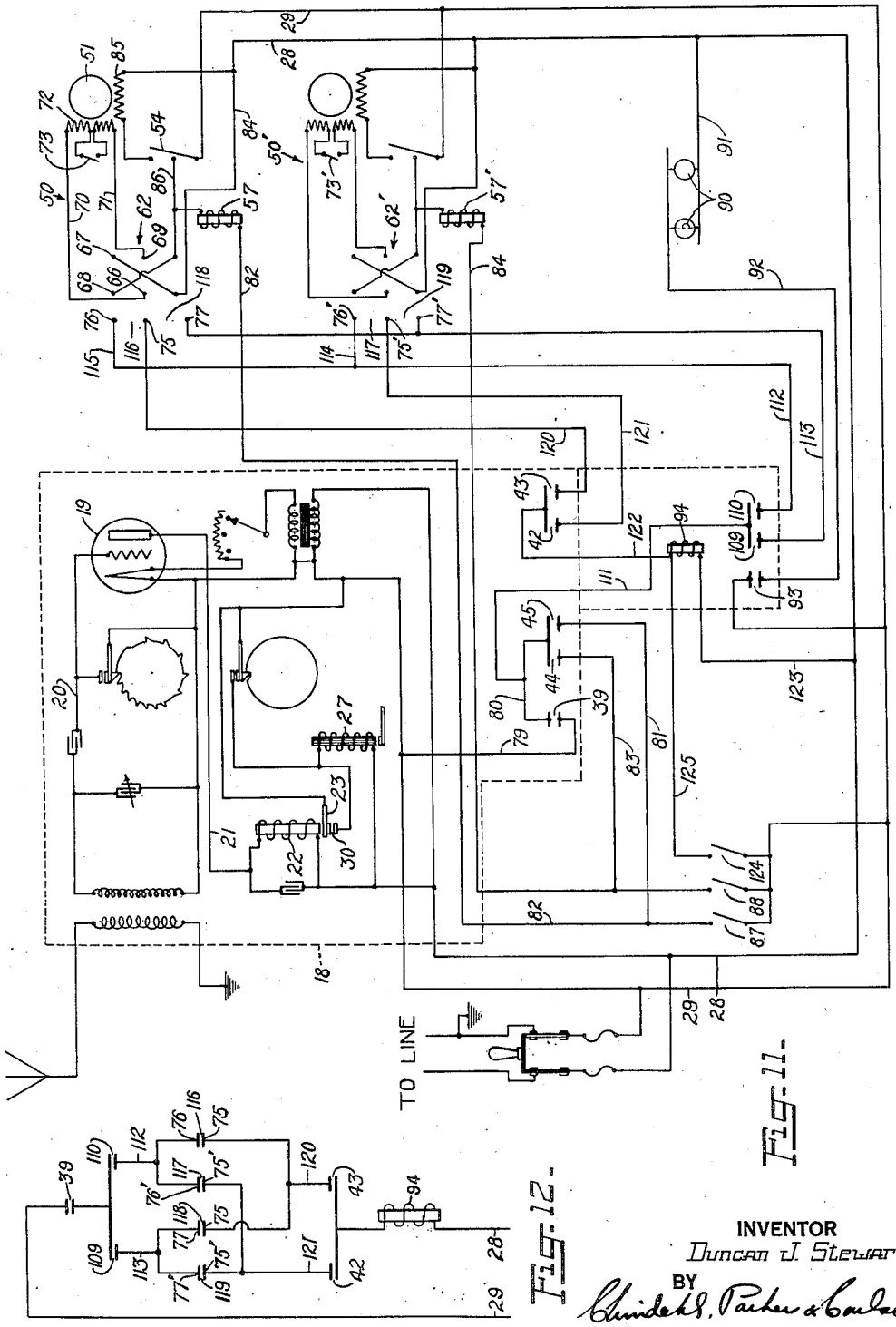

Patented Dec. 2, 1930

1,783,633

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

LIGHT-CONTROL SYSTEM

Application filed March 23, 1927. Serial No. 177,555.

My invention is directed to improvements in light control systems and has more particular reference to a system for selectively controlling the electric lighting circuit in a garage or other building.

One object of the invention is to provide a novel means for controlling the electric lighting circuit of a garage or other building which means is patricularly adapted to meet the conditions incident to the operation of the light in said circuit from a moving vehicle.

Another object is to provide, in combination with the electric light of a building, a novel means for controlling the operation of said light according to the position of the door or doors of the building.

A further object is to provide a system of control for the electric light of a garage building which is adapted to be operated by signals transmitted from each of a plurality of motor vehicles and controlled according to which of the vehicles transmits a signal.

Still another object is to provide, in combination with a lighting circuit, an improved means by which the lights in said circuit are controlled automatically according to their condition at the time when an attempt is made to turn them on or off.

Other objects and advantages will become apparent from the following detailed description taken in connection with the accompanying drawings, in which Figure 1 is a view of a part of a garage, the lighting circuit of which is adapted to be controlled by my improved control system.

Fig. 2 is a view of the garage and one of the motor vehicles equipped to control the doors and lighting circuit of the garage.

Fig. 3 is a fragmentary view of a radio receiving mechanism adapted for use in connection with the present invention.

Fig. 4 shows in detail the switch mechanism operated by the radio receiver.

Figs. 8 and 9 are fragmentary views of an electromagnetic switch for controlling the lighting circuit in the garage building.

Fig. 10 is a fragmentary perspective view of the contacting means of the electromagnetic switch.

Fig. 11 is a theoretical wiring diagram of the operators for the garage doors and the means for controlling said operators and the garage lights.

Fig. 12 is a simplified wiring diagram of the circuits for controlling the garage lights.

Figure 5:
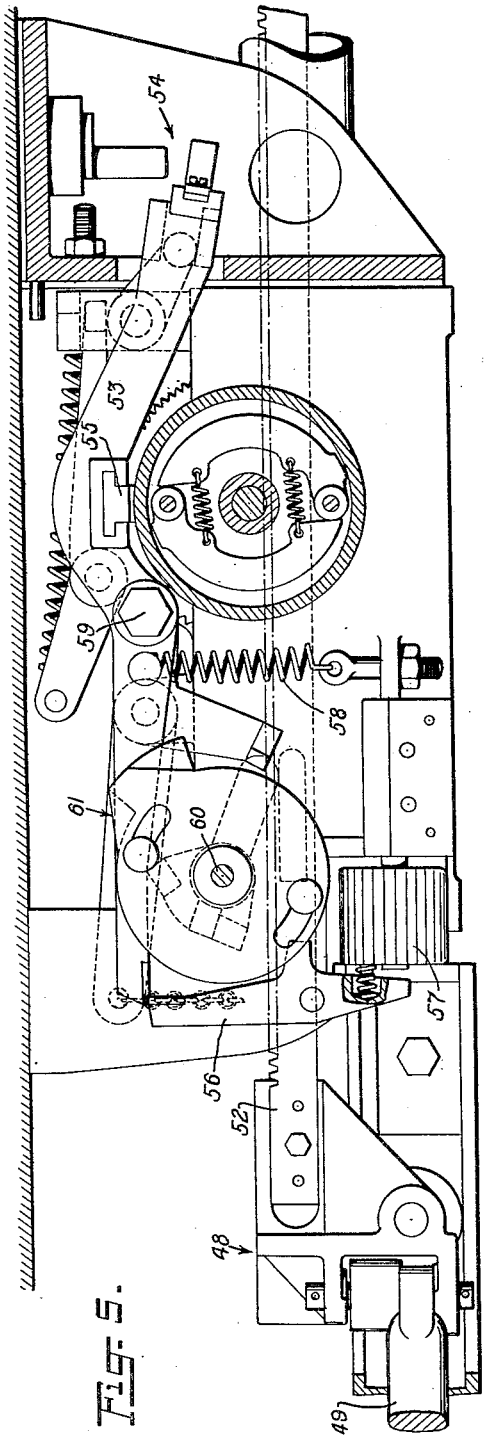
Fig. 5 is a fragmentary side view of the door operator shown in Fig. 1.
Figure 7:
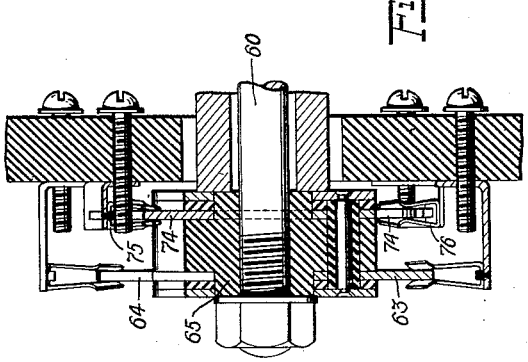
Fig. 7 is a view taken along the line 7—7 of Fig. 6.

The objects of the invention thus generally stated, together with other and ancillary advantages are obtained by the construction and arrangement illustrated in the accompanying drawings forming part hereof and hereinafter fully described. It is contemplated, however, that various changes in the construction and arrangement employed may be made by those skilled in the art without departing from the spirit and scope of the invention as expressed in the appended claims.

The invention is especially adapted for use in selectively controlling the electric lights in a garage or other building from a remote point as, for example, by means of preconcerted signal combinations of radiant energy fields transmitted from a motor vehicle. This application on the invention will therefore be described.

In the present embodiment, the garage building shown in Fig. 2 is adapted to accommodate a plurality of motor vehicles and therefore has a plurality of doorways, there being two in the present instance which are adapted to be closed respectively by sets of doors 14 and 15. The space in the garage corresponding to the doors 15 may be assigned to a motor vehicle X (Fig. 2) while the doorway closed by the doors 14 may be used only by a vehicle Y, not shown herein.

When the invention is used for the purpose above mentioned, a signal transmitter forming the subject matter of a copending application Serial No. 175,377 filed March 14, 1927, by Howard D. Colman, may be provided on each of the motor vehicles X and Y. As fully described therein, each of these signal transmitters is constructed so as to send out in quick succession in a definite timed relation an invariable code combination of radiant energy impulses and space units, followed by an impulse or space unit to effect the selection of the set of doors to be opened or closed under the control of the signal transmitted. An additional signal impulse may also be transmitted for controlling the operation of the electric lights in the garage, this impulse being added to the code combination automatically if the light circuit on the vehicle is closed at the time the signal transmitter is operated. Thus, the transmitted signal may be regarded as having three component parts, one comprising a plurality of units representing an invariable code combination, a second or light controlling part, and a third or door selecting part. The sending device on each vehicle may operate in conjunction with the usual spark coil for emitting fields of energy from an antenna 16 which, as shown in Fig. 2, may be carried beneath the body of the vehicle. Any suitable means (not shown) such as a push-button on the dash board of the vehicle, may be employed to enable the driver of that vehicle to initiate the operation of his sending device.

The signal transmitted from either vehicle may be received by an antenna 17 preferably embedded in the driveway leading to the doorways for the respective cars. In a copending application Serial No. 120,763 filed by Howard D. Colman on July 6, 1926, there is disclosed a selective receiving mechanism with which the antennæ 17 may be connected for the purpose of detecting the impulses received thereby and for controlling the garage lights and the selection of the set of doors to be operated according to the character of the signal received thereby. The theoretical diagram for this selective receiver is shown in the dotted enclosure indicated by the numeral 18 in Fig. 11. Referring to this diagram and also to Figs. 3 and 4, the receiving mechanism comprises generally a three element detector tube 19 whose input circuit 20 is conditioned to respond to the received signal impulses thereby effecting changes in the current flowing in the plate or output circuit 21, a magnet 22 being provided in this latter circuit to control a selector device. This selector is controlled by the armature 23 of the magnet 22 and comprises generally a series of pins 24, 25 and 26 mounted in a rotatable drum which is adapted to be driven in timed relation with the signal transmitter on the signalling vehicle, as, for example, by means of a synchronous motor of the vibratory type. The driving magnet 27 (Fig. 11) of the motor may be energized from alternating current power lines 28 and 29, the latter preferably being connected to the grounded side of the power supply.

In operation, the armature responds to the first impulse of the received signal to start the driving motor by closing the switch 30 and thereafter controls a pivotal pushing device 31 (Fig. 3) by moving into the space between an arm 32 on the pusher and a fixed abutment 33. Thus, if a pin in the drum is opposite the pusher when the latter is blocked by the armature, that pin will be pushed longitudinally of the drum by the cam action of the pusher.

In the form illustrated, the selector pins 24 are made in two sections, one of which is carried by two disks 34 and 35 rigid with the drum shaft, the other section being carried by a disk 36 loose on the drum shaft. Certain of the pins are arranged when in normal position to lock the disks 34 and 36 together, but if the proper signal combination is received so as to push these pins only, thereby bringing their dividing lines between the disks 34 and 36, the disk 36 will be permitted to move relative to the disk 34. These disks have cam segments 37 thereon which act on followers 38 simultaneously when the disks are locked together but successively when the disk 36 is freed by the setting of the pins in the proper combination. In the latter case, a switch 39 (Fig. 4) formed by the two followers 38 will be closed momentarily to initiate the operation of an operator for opening and closing the garage doors, and for controlling the garage lights, as will appear hereinafter.

The next two pins 25 to be presented to the pusher 31 are not made in sections but are provided with collars 40 and 41 either of which, if shifted from its normal position by the reception of a signal impulse at the time when it is opposite the pusher, will close corresponding switches 42 or 43 (Fig. 4). These switches are used in the control of the garage lights, and each is intended to be closed in response to a signal sent from only one of the cars X or Y. Thus the signal transmitter on the car X will be constructed so that it will, if the car lighting circuit is closed at the time a signal is transmitted, send an impulse at the time when one of the pins 25 is in position to be pushed, while the transmitter for the car Y will be adapted to send a light control impulse for operating the other pin 25 only. In this way either the switch 42 or the switch 43 will be closed when the corresponding motor vehicle sends its signal, provided the lighting circuit on that car is closed at the time.

The auxiliary pin 26 is adapted to close one of two door selecting switches 44 and 45 (Fig. 4) upon each revolution of the selector drum. To this end, it carries a collar 46 which, if shifted from normal position by the pusher 31 will close the switch 44 while the switch 45 will be closed if the pin 26 is not shifted under the control of the received signal.

The switches 39, 42, 43, 44 and 45 are mounted on an insulating block (Fig. 4) and positioned so as to be operated upon simultaneously by the selector drum at the end of each revolution thereof.

It will be seen that the selecting apparatus thus described is adapted to control the selection of a combination switch 39, door-selecting switches 44 and 45, and light-controlling switches 42 and 43, in response to codal signals sent from either of the two motor vehicles X and Y. Thus, the arrangement may be such that when the car X signals with its lighting circuit open, switches 39 and 44 will be closed simultaneously, but if the lighting circuit is closed when the signal is transmitted, switch 42 will also be closed. Likewise car Y will cause switches 39 and 45 to be closed simultaneously when signalling with its lighting circuit open, while switches 39, 45 and 43 will be closed when the car Y signals with its lighting circuit closed.

A power driven door operator of the type illustrated in Figs. 1 and 5 and more fully described in the application of Howard D. Colman Serial No. 166,086 filed February 5, 1927, may be provided for operating each pair of doors when the proper signal combination is received. Briefly stated, the operator therein disclosed comprises a traveling car 48 connected by rods 49 to each door of a set, and a motor driven power unit 50 for moving the car along a trackway in one direction to open the doors and in the opposite direction to close the doors.

The driving unit (Fig. 5) for each operator includes a single phase induction motor 51 (Fig. 1) connected through appropriate speed reduction gearing (not shown) to a rack bar 52 which is secured to the car 48. A floating lever 53 is employed for controlling the main motor switch 54 and operating a brake 55 to initiate and terminate each opening and closing cycle of operation of the driving unit.

Normally the lever 53 is held in releasable position as shown in Fig. 5 by a latch 56 constituting the armature of a magnet 57. When the magnet is energized to trip the lever, a spring 58 swings the lever about a pivot stud 59 which is then stationary, thereby closing the motor switch and releasing the brake to initiate a cycle of operation of the motor. Near the end of the cycle, a cam shaft 60 is oscillated in one direction or the other through a lost motion connection with a rack bar 52, and a cam device 61 thereon swings the lever 53 about its rear end as a fulcrum to reset the latch 56 for the next cycle of operation and thereafter releases the lever 53. When thus released, the lever pivots about the end of the latch 56 as a fulcrum and in this movement opens the motor switch 54 and applies the brake, the door operating cycle being thereby automatically terminated.

Figure 6:
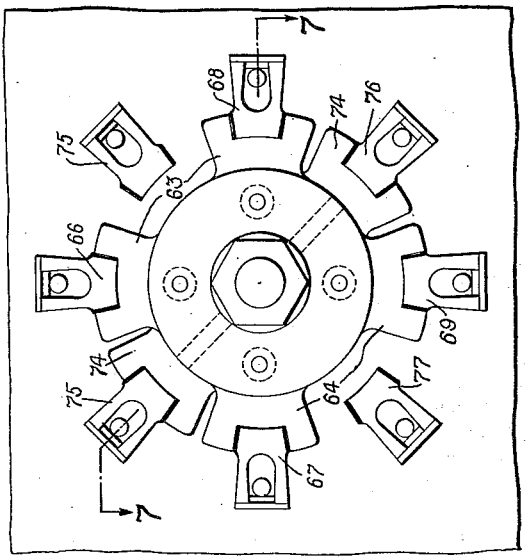
Fig. 6 is a detail view of a reversing switch used on the operator.

The direction of rotation of the motor either to open or to close the doors is determined by a reversing switch 62 herein shown as comprising two insulated connecting plates 63 and 64 mounted in an insulating block 65 on the cam shaft 60 and adapted to connect stationary contacts 66 and 67 with contacts 68 and 69 respectively, when the cam shaft is oscillated into door-closed position as shown in Fig. 6 and to connect contacts 66 and 68 with contacts 67 and 69 respectively, when the cam shaft is in its door-open position. As shown in Fig. 11, the contacts 66 and 69 are connected respectively by conductors 70 and 71 to the starting field 72 of the motor in which is interposed the usual switch 73 which is closed when the motor is stopped and held open by centrifugal action when the motor is running. With this arrangement, the power driving unit is adapted to open and close its doors alternately in successive operating cycles.

The block 65 also carries a plate 74 which connects one of two contacts 75 with a contact 76 when the cam shaft is in a position (Fig. 6) corresponding to the closed position of the doors and the other contact 75 with a contact 77 when the cam shaft is in the other position. Thus, a single-pole-double-throw switch is provided for use in connection with the control of the garage lights as will appear later.

*Door operation*

Closure of the switches 39 and 45 simultaneously under the control of the signal sent from the car Y may be utilized to energize the latch magnet 57 of the door operator 50 for opening or closing the doors 14 of the doorway assigned to the car Y while energization of a latch magnet 57' to open or close the doors 15 may be effected by closure of the switches 39 and 44 simultaneously. To these ends, the combination switch 39 is connected as shown in Fig. 11 to the power line 29 by a conductor 79 and to each of the door selector switches 44 and 45 by a conductor 80. Each of the switches 44 and 45 is adapted to control the energization of the latch magnet for the corresponding door operator. In the case of the operator 50 for the car Y, the energizing circuit for the latch magnet 57 leads through conductors 81 and 82 while conductors 83 and 84 extend from the switch 44 to the latch magnet 57' for the door operator corresponding to the car X.

The energizing circuit for the latch magnet 57 of the power operator 50 may be traced as follows, assuming that switches 39 and 45 are closed simultaneously by the reception of the proper signal combination transmitted from the car Y: From the power line 29 through conductor 79, switch 39, conductor 80, switch 45, conductors 81 and 82, latch magnet 57, closed contacts 68 and 66 of the reversing switch, conductor 70, starting field 72 of the motor, switch 73 which is then closed, the motor being stopped, conductor 71, reversing switch contacts 69 and 67, and a conductor 84 to the power line 28. Energization of the magnet 57 releases the floating control lever 53 of the door operator which closes the main motor switch 54 thereby connecting the main motor field 85 to the power lines 28 and 29 and also establishing a circuit for the starting field 72 as follows: from the power line 29, through the switch 54, a conductor 86, contacts 68 and 66, conductor 70, field 72, switch 73 which is still closed, conductor 71, contacts 69 and 67, conductor 84 to the power line 28. When the motor 51 has attained a predetermined speed, the switch 73 will be opened thereby cutting out the starting field 72. At the end of the door operating cycle, the switch 54 will be opened automatically as above described to stop the motor and the reversing switch 62 will be actuated to connect contacts 66 and 67 and contacts 68 and 69. This will condition the motor for reverse rotation when the latch magnet 57 is again energized. Similar operating circuits may be traced to show that the latch magnet 57' for the operator 50' corresponding to car X will be energized whenever switches 39 and 44 are closed simultaneously and the motor of this operator is stopped so that switch 73' will be closed.

To permit operation of the door operator 50 independently of the radio receiving mechanism, a switch 87 may be provided inside of the building for connecting the conductor 82 to the power line 29. This switch being in parallel with the switches 39 and 45 is adapted, when closed, to close the energizing circuit for the latch magnet 57. A similar switch 88 connecting the power line 29 and the conductor 83 may be provided to permit operation of the power operator 50' for the other set of doors.

Attention is directed to the fact that by connecting the combination switch 39 and the door selecting switches 44 and 45 in series within the energizing circuits for the latch magnets for the power operators, operation of the doors can take place only when the proper signal combination is received. If the combination switch were not included, one of the door operators would be started upon each revolution of the selector drum which, it will be remembered, is adapted to be started upon the reception of an impulse of radiant energy sufficient to move the selector armature 23.

*Light control*

To effect the proper operation of the garage lights under the control of the light control signal combinations sent from either of the cars X and Y, means are provided which are operable to turn the garage lights on when either car with its light circuit closed signals to open its doors; to turn off the lights in the garage when either car, with its light circuit closed, signals to close its doors; to leave the garage lights off when either car with its lighting circuit closed signals to close its doors; and to leave the garage lights on when either car with its lighting circuit closed signals to open its doors. These results are accomplished, in the present instance, by providing an electromatically operated switch for turning the garage lights on or off and a switching mechanism having a plurality of means for controlling the operation of said switch, first, according to whether the lighting circuit on the signalling car is open or closed; second, according to the condition of the garage lights; third, according to the position of the doors for the car X; fourth, according to the position of the doors for the car Y; and fifth, according to which car sends the signal.

Referring to Fig. 11, the garage lights or lamps are indicated by the numeral 90 and are adapted to be connected to the power lines 28 and 29 by conductors 91 and 92 and a light control switch 93 interposed in the conductor 92. This switch is adapted to be closed and opened upon successive energizations of an electromagnet 94. The electromagnetic switch thus provided is shown as a unit in Figs. 8 and 9 and comprises generally the magnet coil 94 suspended from a U-shaped core 95 which is supported between the upturned side pieces of a frame plate 96. The coil has an L-shaped armature 97 one leg of which extends into the magnet coil. The armature is pivotally supported between two arms 98 which in turn are pivoted on the main frame at 99.

Pivoted between the upwardly extending ends of the arms 98 is a pawl 100 adapted to advance a ratchet wheel 101 fixed on a rotatable shaft 102. The ratchet wheel has teeth each having an inclined surface 103 to be engaged by the pawl 100, and a radial surface 104 to be engaged by a stop 105 on an arm 106 rigid with the pawl and tending by reason of its weight to swing the pawl into engagement with the ratchet teeth. The arrangement just described is such that the shaft 102 will be advanced one step when current is applied to the winding of the coil 94.

Normally the armature and the lever arms 98 are positioned as shown in dotted outline in Fig. 8, the weight 106 then serving to hold the pawl in engagement with one of the ratchet teeth. When the coil is energized, the armature is attracted to the core thereby raising the pawl as shown in full lines in Fig. 8 and advancing the wheel 101 one step, the final portion of the movement, taking place after the circuit has been broken, being caused by the inertia of the armature. In this movement, the stop 105 enters the space between two of the ratchet teeth, engaging a surface 104 to arrest the motion of the shaft and prevent overrun thereof. Finally the armature and the lever arms 98 fall back into position for the next operation.

Mounted on the shaft 102 are three cam members 107 each having teeth which work against spring follower arms 108 to close or permit the opening of three switches 93, 109 and 110 (Fig. 11) each having one contact carried by one of the followers 108. Switch 93, as above described, is the control switch for the garage lights. For purposes which will presently appear, the cam members 107 are arranged on the shaft 102 so that the switches 93 and 109 will be closed and the switch 110 will be opened upon alternate advancing steps of the shaft, while on the remaining steps, the switches 93 and 109 will be opened and the switch 110 will be closed. In the former case, the garage lights will be turned on, and in the latter case, the lights will be turned off.

The switching mechanism by means of which the magnet 94 is energized to control the garage lights comprises generally four independent circuits interposed in parallel between the combination switch 39 which is connected to the power line 29 and the magnet coil 94 which is connected to the other power line 28. Each of these circuits contains three switches which are arranged to be operated in various combinations to meet the requirements above outlined.

Proceeding now with a more detailed description of these four energizing circuits and referring to Fig. 11 and the simplified diagram of the light control circuit shown in Fig. 12, the means for controlling the garage lights according to whether these lights are on or off when the proper signal combination is received by the selector comprises the two switches 109 and 110 which are connected to the combination switch 39 by a common conductor 111 and which constitute a single-pole, double-throw switch. It will be remembered that the switch 109 is open and the switch 110 is closed when the garage lights are off and vice versa. Therefore, when the lights are off, the energizing circuit for the magnet 94 extends through the switch 110 to a conductor 112, and when the lights are on through the switch 109 to a conductor 113.

Branching from the conductor 112 is a conductor 115 which leads to the contact 76 of the single-pole, double-throw switch on the door operator 50 corresponding to the car Y. Another branch 114 from the conductor 112 leads to the corresponding contact 76' of the single-pole, double-throw switch of the door operator 50'. The contacts 76 and 76' cooperate with their respective contacts 75 and 75' to form switches 116 and 117 which, as above described, are closed by the respective connector plates 74 when the corresponding doors are closed and are open when the doors are open.

Similarly, the conductor 113 has branches leading respectively to the contacts 77 and 77' of the corresponding switches on the door operators. These contacts cooperate with the contacts 75 and 75' to provide switches 118 and 119 which, as hereinbefore described, are closed when the corresponding sets of doors are open and are open when the doors are closed. Thus, four branch circuits are provided through which the magnet 94 may be energized each containing one of the four switches 116, 117, 118 and 119. Since the switches 116 and 118 are operated by the door operator 50, the energizing circuit for the magnet 94 will be controlled by the position of the doors 14, that is, according to whether the doors are open or closed. Also the path of the energizing current may be determined by the position of the doors 15 inasmuch as the switches 117 and 119 are controlled by the operator for these doors.

The contacts 75 of the single-pole, double-throw switch on the operator 50 are connected by a conductor 120 to the light-control switch 43 which, it will be remembered, is closed when a light control signal unit is sent from the car Y. Likewise, the contacts 75' in the case of the door operator 50' are connected by a conductor 121 to the light control switch 42, which is adapted to be closed under the control of the signal from the car X. Therefore, since all of the four circuits above mentioned lead through the two switches 42 and 43, and the combination switch 39, the path of the energizing current for the magnet 94 will depend upon which of the cars X or Y is signalling and whether the light circuit on the car is open or closed at the time the signal is transmitted.

Switches 42 and 43 are connected by a common conductor 122 to one end of the magnet coil 94, the other end being connected to the power line 28 through a conductor 123.

It will be seen that all of the four possible paths for the energization of the coil 94 include the combination switch 39 so that the garage lights can only be turned on or off when the proper signal combination is received. In addition, it will be noted that each energizing circuit contains three switches which must be closed simultaneously in order to operate the electromagnetic light switch. Thus, one circuit extends through the switches 109, 119, and 42, a second extends through the switches 109, 118 and 43, a third extends through the switches 110, 117 and 42, and the fourth extends through the switches 110, 116 and 43. It will be understood that inasmuch as there are five variables for controlling these four energizing circuits for the electromagnetic switch, thirty-two different conditions might arise in the operation of the garage lights from the two cars X and Y. All of these conditions may, however, be combined under four general conditions, each of which will now be considered, the energizing circuits therefor being traced.

First: When either car X or car Y, with its light circuit closed, signals to open its doors, the doors for the other car being either open or closed and the garage lights being off, the garage lights will be turned on. If, under these conditions, car Y is the one signalling, switches 39 and 45 will be closed simultaneously by the selector causing the doors 14 to be opened and switch 43 will also be closed momentarily. Under the conditions assumed, the switch 116 is closed because the doors 14 are closed and switch 110 is closed because the garage lights are off. Therefore, the magnet coil 94 will be energized through a circuit leading from the power line 29 through conductor 79, switch 39, conductors 80 and 111, switch 110, conductors 112 and 115, switch 116, conductor 120, switch 43, conductor 122, the magnet coil 94, conductor 123 to the power line 28. Energization of the magnet operates to advance the ratchet wheel 101 to close the switch 93 thereby turning on the lights, at the same time closing switch 109 and opening switch 110. A similar energizing circuit can be traced when car X signals to open its doors under the conditions above described. This circuit would be through the switches 39, 110, 117 and 42. Under the conditions assumed, it will be apparent that the positions of the doors other than the ones to be opened do not affect the energization of the magnet. This illustration includes all of the conditions under which the garage lights will be turned on and is represented by the third and fourth circuits as summarized in the paragraph next preceding.

Second: When the garage lights are on and either car signals to close its doors with its light circuit closed, the doors for the other car being either open or closed, the garage lights will be turned off. Under these conditions, switches 109, 118 and 119 are closed, and if car Y, for example, sends the signal, the magnet 94 will be energized as follows: From the power line 29 through conductor 79, the combination switch 39, conductors 80 and 111, switch 109, conductor 113, switch 118, conductor 120, switch 43, conductor 122, the magnet coil 94, conductor 123, to the power line 28. In this way, the switch 93 is opened to turn off the garage lights. Thus when leaving the garage at night, the driver in either car may close the doors for his car and turn off the garage lights. If, however, he is inside of the garage, for instance, and wishes to have the garage lights remain on for his own convenience or for the convenience of the driver of the other car, it is merely necessary to turn off his car lights before sending the signal to close the doors. This illustration includes all of the conditions under which the garage lights will be turned off automatically when the cars signal and is represented by the first and second circuits as above summarized.

Third: If the garage lights are off and either car, with its light circuit closed, signals to close its doors, the garage lights will not be turned on because all of the four possible paths for the energization of the magnet 94 will be broken. Under these conditions, switch 109 would be open thereby breaking two of the energizing circuits, the switch 116 or 117 corresponding to the car signalling would be open thereby preventing closure of one of the circuits through the closed switch 110, and the light control switch 42 or 43 corresponding to the car not signalling would interrupt the fourth circuit. Therefore, under such conditions there is no possibility of turning on the garage lights when either car signals to close its doors.

Fourth: If the garage lights are on when either car, with its light circuit closed, signals to open its doors, the garage lights will not be turned off. Under these conditions the magnet 94 cannot be energized for the reason that the switch 110 is open at that time, thereby interrupting two of the possible energizing circuits. Since one of the switches 42 and 43 would not be closed by the selector, the only other available path for energization of the magnet is through one of the switches 118 and 119 which at that time is open because the corresponding door operator is in closed position.

To permit operation of the garage lights at the will of the operator, a push-button switch 124 may be mounted inside of the garage building and interposed in a conductor 125 leading from one end of the magnet coil 94 to the power line 29. By closing this switch, the magnet may be energized to turn the garage lights on or off as the case may be.

It will be apparent that the number of switches and circuits employed for energizing the coil of the electromagnetic switch may be reduced or multiplied to meet the various conditions encountered in the service use of the present light control system. For example, when the system is applied to a garage or other building having but one door or set of doors to be operated by a power driving mechanism, only two energizing circuits for the electromagnetic switch need be provided since one of the light control switches 42 or 43 controlled by the radio receiving mechanism would be omitted. Under such conditions, one of the parallel energizing circuits for the electromagnetic switch would include the switch 110 and a switch on the power operator for the doors corresponding to the switch 116, this latter switch being closed when the doors are in closed position. The other circuit would include the switch 109 and a switch corresponding to switch 118, the latter being closed when the doors are in open position. When the system is applied to a garage having more than two doorways, the number of energizing circuits would be correspondingly multiplied.

It will also be noted that the combination switch 39 may be omitted by providing a radio receiving mechanism in which the operation of the door selecting and light control switches is effected by signal combinations as distinguished from a signal impulse or unit following a preconcerted combination as in the present embodiment.

It will also be observed that the invention lends itself readily to use in cases where due to the inability to provide connecting wires between the lighting circuit and the operator, control must be effected through the medium of radiant energy; and where associated mechanisms such as door operators are adapted to be operated selectively.

I claim as my invention:

1. A control mechanism having, in combination a building and a door for said building; of an electric circuit having a light therein, means controlling the opening and closure of said circuit including an electromagnet and two independent circuits arranged in parallel and adapted to control the energization of said magnet, a switch in one of said circuits adapted to be closed when the light in said lighting circuit is on and open when said light is off, a switch in said other circuit adapted to be open when the light is on and closed when the light is off, a switch in said last mentioned circuit adapted to be closed when said door is closed and open when the door is open, and a switch in said other circuit adapted to be open when the door is closed and closed when the door is open.

2. A system for controlling the light in a garage having a pair of doors comprising, in combination, control means by which said light may be turned on and off, a selective signal receiving mechanism responsive to different codal combinations of signal impulses, switching means operable upon the reception of a predetermined signal combination by said mechanism when said light is off and one of said doors is closed for actuating said control means to turn on said light, a second switching means operable upon the reception of a different combination by said mechanism when said light is off and said other door is closed for actuating said control means to turn on said light, a third switching means operable upon the reception of said first mentioned signal combination with the first mentioned door open and said light on to actuate said control means to turn off said light, and a fourth switching means operable upon the reception of said second signal combination with said second door open and the light on to actuate said control means to turn off said light.

3. A system for controlling the lighting circuit in a garage having a pair of doors comprising, in combination, a selective signal receiving mechanism responsive to different codal combinations of signal impulses, an electromagnet, means operable to alternately open and close said lighting circuit upon successive energizations of said magnet, and four independent circuits each leading through the winding of said magnet; one of said circuits including in series relation a switch closed by said mechanism upon the reception of a predetermined signal combination, a swit which is closed when one of said doors is in closed position, and a third switch which is closed when said lighting circuit is open; the second of said circuits including said signal responsive switch, a switch which is closed when said first mentioned door is in open position, and a switch which is closed when said lighting circuit is closed; the third of said circuits including a switch responsive to a predetermined different signal combinaton, a switch which is closed when said second door is in closed position, and a switch which is closed when the lighting circuit is open; the fourth of said circuits including said second mentioned signal responsive switch, a switch which is closed when said second door is in open position and a switch which is closed when said lighting circuit is closed.

4. A system for controlling the lighting circuit of a garage having a pair of doors comprising, in combination, control means for opening and closing said lighting circuit, signal receiving mechanism, means responsive to the reception of a predetermined signal by said mechanism to actuate said control means to close said lighting circuit provided one of said doors is in closed position, and means responsive to the reception of a different signal by said mechanism to actuate said control means to close said lighting circuit provided said other door is in closed position.

5. A system for controlling the lighting circuit of a garage having a pair of doors comprising, in combination, control means for opening and closing said lighting circuit, means capable of actuating said control means to close said lighting circuit provided one of said doors is in closed position and said lighting circuit is open, and means capable of actuating said control means to close said circuit provided said other door is closed and said lighting circuit is open.

6. A system for controlling the lighting circuit of a building having a door comprising, in combination, an electromagnet, means actuated by successive energizations of said magnet to alternately open and close said circuit, a switch in the energizing circuit of said magnet, and a pair of conductors interposed in parallel relation between said magnet and said switch, one of said conductors including a switch arranged to be open and closed when said door is in open and closed positions respectively and a second switch which is open when said lighting circuit is closed and closed when said lighting circuit is open, said other conductor including a switch which is open when said door is in closed position and closed when the door is in open position and a switch which is open when said lighting circuit is open and closed when said lighting circuit is closed.

7. A system for controlling the lighting circuit of a building having a door comprising, in combination, control means for opening and closing said lighting circuit, means adapted when operated with said door in closed position to actuate said control means to close said lighting circuit, and means operable to prevent said lighting circuit from being opened when said last mentioned means is actuated with the door in closed position in the event that said lighting circuit is already closed.

8. A system for controlling the lighting circuit of a building having a door comprising, in combination, electromagnetic means, means operated upon successive energizations of said electromagnetic means to alternately open and close said lighting circuit, a switch controlling each of said energizations, and a pair of switches in series with said switch and permitting the flow of current through said electromagnetic means by the closure of said first mentioned switch only when said door is closed and said lighting circuit is open, and a second pair of switches in series with said first mentioned switch and permitting the flow of current therethrough only when said door is open and said lighting circuit is closed.

9. Means controlling the closure of the lighting circuit of a building having a door comprising, in combination, an electromagnetic switch having a winding by the energization of which said circuit may be closed and means providing an energizing circuit for said winding including a control switch, and means operating automatically as an incident to the closure of said door and the opening of said lighting circuit to condition said magnet circuit for closure by the actuation of said control switch.

10. The combination with a lighting circuit of a building having a door of a switch controlling said circuit, means by which said switch may be actuated to turn on a light in said circuit, a device responsive to the position of said door, and a device responsive to the condition of said lighting circuit, said devices coacting to permit effective actuation of said means when said door is closed and said circuit is open.

11. Means controlling the opening of a lighting circuit of a building having a door comprising, in combination, a switch adapted when closed to retain said circuit closed, an electromagnetic actuator by which said switch may be opened, and means providing an energizing circuit for the winding of said actuator including means operating automatically to condition said magnet circuit for closure provided said door is open and said lighting circuit is closed, said last mentioned means serving to interrupt said magnet circuit automatically as an incident to the opening of said lighting circuit and to the movement of the door to closed position.

12. The combination with the lighting circuit of a building having a door of a switch controlling said circuit, means by which said switch may be actuated to interrupt said circuit, a device responsive to the position of said door, and a device responsive to the condition of said lighting circuit, said devices coacting to permit of effective actuation of said means when said door is open and said circuit is closed.

13. In combination with a lighting circuit of a building having a door, a switch controlling said circuit, an electromagnetic actuator for said switch, two energizing circuits for said electromagnetic means including a switch controlling the closure of each of said circuits, an auxiliary switching mechanism operable automatically as an incident to the movement of said door to open position and to the closing of said lighting circuit for conditioning one of said energizing circuits for energization of said actuator, and a second auxiliary switch mechanism operable automatically as an incident to the movement of said door to closed position and to the opening of said lighting circuit for conditioning said other circuit for energization of said actuator.

14. The combination with a lighting circuit of a building having a door, of a switch controlling said circuit, electromagnetic means adapted upon successive energizations to turn said light on and off alternately, means providing two circuits each controlling the energization of said electromagnetic means, and means operable automatically as an incident to the movement of said door to closed and open positions for transferring the control of said electromagnetic means first to one of said circuits and then to the other.

In testimony whereof, I have hereunto affixed my signature.

DUNCAN J. STEWART.